Sept. 22, 1970 P. TAURIGNAN 3,529,339
REPAIR JIG
Filed Nov. 20, 1967
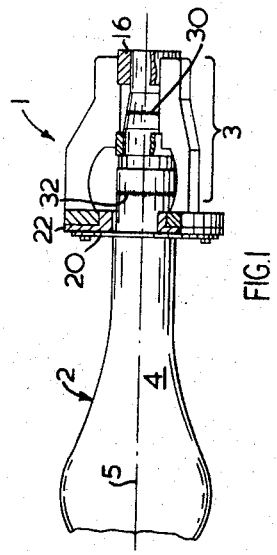
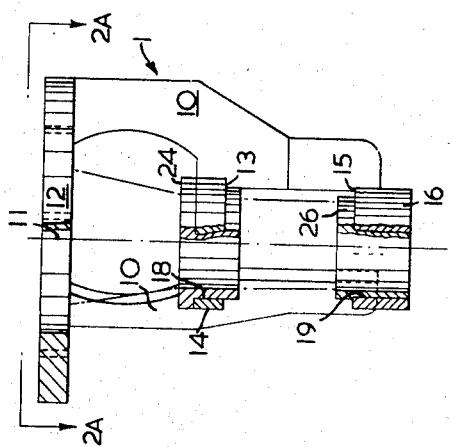
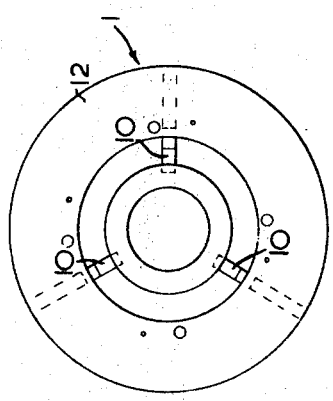
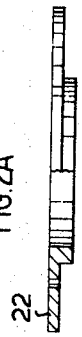
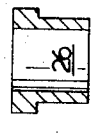
INVENTOR
PAUL TAURIGNAN
By Cushman, Darby & Cushman
ATTORNEYS United States Patent Office 3,529,339
Patented Sept. 22, 1970

3,529,339
REPAIR JIG
Paul Taurignan, Box 222, Rouyn, Quebec, Canada
Filed Nov. 20, 1967, Ser. No. 684,339
Claims priority, application Canada, July 6, 1967,
994,777
Int. Cl. B23p 7/00, 19/00
U.S. Cl. 29—200                5 Claims

ABSTRACT OF THE DISCLOSURE

A repair jig is described for repairing in situ a damaged wheel housing on a vehicle. The damaged part is removed and a replacement housing welded in alignment with the undamaged housing. The jig includes a mounting flange which rigidly interconnects a plurality of support members, each member having a bearing surface such that the jig may receive and support the replacement housing.

---

This invention relates to apparatus for facilitating the repair of a damaged, i.e., broken or cracked axle housing on a vehicle. More particularly, the present invention provides a portable jig which permits on-the-spot repairing of a damaged wheel housing portion of the axle housing on a motor vehicle by replacing the damaged portion.

Whenever a motor vehicle such as a truck, for instance, has had the wheel housing portion of its axle housing damaged, i.e., broken or cracked to the extent that it no longer can be operated, the practice heretofore has been either to unload the vehicle and tow it back to a garage or workshop where the necessary repairs could be carried out, or alternatively, in some instances to remove the axle and axle housing from the vehicle concerned, and take only the axle housing to the garage or workshop where the necessary repairs could then be made. It will be readily appreciated that in either of such cases, if the truck has broken down at a considerable distance from the nearest town, garage or workshop, much time and money would be lost before the repairs could be made.

In a typical case, for instance, transport trucks used in the logging industry frequently travel to remote areas to pick up loads of logs. Very often the roads in such areas are rough and in relatively poor condition. If the truck were to receive damage to its wheel housing portion of the axle housing, such as by striking a rock, by failure of the material on account of fatigue, or overstressing due to overloading, the closest workshop where repairs might be made is usually a long distance away. Unless repairs can be made quickly and on-the-spot, the truck will be held idle and not in productive use, resulting in time and money being lost. Lost time and money ranging up to several days and several hundreds of dollars has not been uncommon.

It is therefore broadly an object of the present invention to provide a portable jig for effecting repairs to the damaged portion of the axle housing on a vehicle out in the field, or work site.

It is another object of the present invention to provide apparatus whereby repairs may be made in situ to the damaged portion of the axle housing of a wide variety of vehicles.

In a broad sense, the present invention may be embodied in a portable jig for repairing a damaged portion of an axle housing in situ on a vehicle by removing said damaged portion and replacing the same; said jig comprising, support means forming a generally open frame which defines a cavity for receiving and supporting a replacement part for said damaged portion, the support means including bearing means having a bearing surface for supporting the replacement part in proper alignment; and mounting means adapted to be detachably securable to the undamaged portion of said axle housing whereupon said replacement part is carried in proper alignment with and abutting against the undamaged portion of the axle housing to facilitate connecting the same together.

In the accompanying drawings which illustrate a preferred embodiment of the present invention;

FIG. 1 is an elevation view partly in section and partly schematic showing the repair jig described herein mounted on a truck axle housing;

FIG. 2 is an elevation view partly in section showing structural detail of the repair jig;

FIG. 2a is a plan view taken along 2a—2a of FIG. 2, and

FIGS. 3 and 4 are elevation views, partly in section showing the adaptor flanges and alignment sleeves utilized with the repair jig of the present invention, to facilitate repairing the damaged axle housing of vehicles of different makes and models.

With reference to the drawings, an axle housing for a motor vehicle is shown schematically at 2, and includes a wheel housing or stub shaft portion 3, with a flange 20 being provided intermediate the stub shaft portion and a central portion 4 of the axle housing 2. The exact construction and detail of the stub shaft portion 3 is known to those skilled in the art, and therefore need not be described herein. Furthermore, the structural detail and size of the stub shaft portion 3 varies somewhat depending on the particular type of vehicle. A repair jig 1 is shown as being mounted on the flange 20.

As indicated above, the stub shaft portion 3 may become damaged, that is, cracked or broken due to fatigue failure, overloading or overstressing of the same, and this damage may occur almost anywhere along the length of the wheel housing or stub shaft portion 3. In accordance with the process embodied by the present invention, the stub shaft portion 3 may be cut preferably either at 30 or 32 depending, of course, on the exact location of the crack or break which has occurred. In this way the damaged wheel housing portion of the axle housing is removed. Several known methods may be used for making such cuts, with an oxyacetylene torch being particularly suitable. It is fairly important that the cut at 30 or 32 be substantially perpendicular to the longitudinal axis 5 of the axle housing 2, for ease of connecting the replacement stub shaft to the remaining portion of the axle housing. The replacement stub shaft is placed into and supported by the repair jig 1, being held in proper alignment with the remaining portion of the axle housing when the repair jig is mounted on the flange 20.

The repair jig 1 may be constructed as follows. Support means in the form of a plurality of generally elongated supporting members 10 are rigidly connected by welding, for example, to a mounting member 12 which advantageously may be an annular flange-like element. Together these form a generally open frame which defines an inner cavity therein for receiving and supporting the replacement stub shaft. A shoulder 13 is provided on each of the elongated supporting members 10 approximately centrally thereof, in order to retain a support bearing 14 mounted thereon. Similarly, an end portion 15 of each of the elongated supporting members 10 remote from the mounting member 12 and support bearing 14, is formed to receive and retain a second support bearing 16 generally similar to the support bearing 14. It is to be noted that the support bearings 14 and 16 are generally circular in cross-section, although other symmetrical shapes may also be used, and that the interior surfaces 18 and 19, respectively, in each bearing are carefully machined and in use, are disposed to be substantially parallel to the axis 11 of the repair jig 1. An adaptor flange 22 may be removably connected to the mounting member 12, and is machined to a predetermined size to facilitate mounting of the repair jig 1 onto the axle housing flange 20 of the particular make or model of vehicle being repaired. Such an adaptor flange 22 will be available in a variety of predetermined sizes, for use with a corresponding variety of vehicles.

In a similar fashion, a pair of alignment sleeves 24 and 26 are provided to be closely received by, and mounted in the support bearings 14 and 16, respectively. The alignment sleeves 24 and 26 may be available in a plurality of predetermined sizes, again in order to facilitate the repair of different makes and models of vehicles. On account of the function they serve the alignment sleeves 24 and 26 will be carefully machined and will, of course, be of the same cross-sectional configuration as the support bearings 14 and 16. The alignment sleeves cooperate with the support bearings 14 and 16 to support a replacement for the damaged stub shaft portion 3 in proper alignment.

When an axle housing on a truck, for instance, breaks or cracks it is nearly always at the wheel, in the load bearing area. To repair this damaged wheel housing, the brake assembly, the wheel bearings, the back plate and so on (not shown) are first removed, and then the axle housing 2 is cut at a predetermined distance from the axle housing flange 20, i.e., preferably at 30 or 32. The exact location of this cut is dependent upon just where the break has occurred, as indicated above. The adaptor flange 22, appropriate to the make of vehicle under repair, is then attached to the mounting member 12 of the repair jig 1. Next the alignment sleeves 24 and 26 of the appropriate size are placed into the repair jig 1, to be retained by the support bearings 14 and 16. The replacement stub shaft 3, which has previously been machined carefully on at least the exterior to the appropriate size and configuration from a solid block of No. 1045 steel, for example, is placed into the repair jig 1 to be received in the inner cavity defined by the frame of the repair jig, and subsequently supported in a properly aligned position by the alignment sleeves 24 and 26. The repair jig 1 containing the replacement stub shaft 3 is then bolted, or otherwise removably secured to the flange 20 on the axle housing 2. It is not absolutely necessary that the replacement stub shaft 3 be machined from a solid block of No. 1045 steel, however, it has been found that other types of steel either in solid or tubular form are frequently too brittle, or else lacking in the strength needed for use in a vehicle axle housing. Alternative material could be used providing the strength characteristics thereof are compatible with those required of an axle housing.

The repair jig 1 as shown herein comprises a plurality of generally elongated supporting members 10, three of them spaced 120° apart in this instance, forming the generally open frame noted above, to permit insertion of the replacement stub shaft 3 into the same to be carried thereby, and subsequently accessible for welding of the replacement stub shaft to the remainder of the axle housing 2. Alternatively, the supporting members 10 could be of almost any configuration. Accordingly, it is possible to utilize supporting members each of which has integral therewith a single bearing surface, or a plurality of such surfaces, as desired. The fundamental requirement which must be met by the supporting members and associated bearing and alignment means, whether integral therewith or separate therefrom, is that such supporting members support i.e., carry the replacement stub shaft interiorly of the open frame formed thereby both abutting against, and in proper alignment with the remaining, undamaged portion of the axle housing. Magnetic or electromagnetic support and alignment means could also be used within the scope of the present invention, to carry the replacement stub shaft.

The techniques of carrying out the welding operation contemplated herein, to connect the replacement stub shaft to the undamaged portion of the axle housing, are well known in the art, and therefore need not be described here. Upon completion of the welding operation, the repair jig 1 is disconnected from the axle housing flange 20 and removed to permit any subsequent grinding or filing down of the welded joint if needed or desired, and then permit reassembly of the brakes, wheel bearings and so on onto the repaired wheel housing portion of the axle housing 2.

Furthermore, a repair kit may be provided and preferably may include a repair jig as above described, a plurality of adaptor flanges and alignment sleeves, together with a plurality of replacement stub shafts carefully machined at least on the exterior, each of the adaptor flanges, alignment sleeves and replacement stub shafts being of a predetermined size to facilitate on-the-spot repairing of any one of many different types of vehicles.

I claim:
1. A portable jig for repairing a damaged portion of an axle housing in situ on a vehicle by removing said damaged portion and replacing the same; said jig comprising:
   support means forming a generally open frame which defines a cavity for receiving and supporting a replacement part for said damaged portion, the support means including bearing means having a bearing surface for supporting the replacement part in proper alignment; and
   mounting means adapted to be detachably securable to the undamaged portion of said axle housing whereupon said replacement part is carried in proper alignment with and abutting against the undamaged portion of the axle housing to facilitate connecting the same together.

2. A portable jig for repairing a damaged portion of an axle housing in situ on a vehicle by removing said damaged portion and replacing the same; said jig comprising:
   support means forming a generally open frame, which defines an inner cavity for receiving and supporting a replacement part for said damaged portion, said support means including bearing means substantially symmetrical in cross-section, and having a machined inner bearing surface for supporting said replacement part in proper alignment, and mounting means rigidly connected to said support means and defining an opening therein for enabling insertion of said replacement part therethrough and into said inner cavity, said mounting means being adapted to be detachably securable to the undamaged portion of said axle housing whereupon said replacement part is carried in proper alignment with and abutting against said undamaged portion of the axle housing for facilitating connecting together of the same.

3. The portable jig of claim 1, wherein said mounting means includes at least one adaptor flange of a predetermined size for detachably securing said jig on a flange formed on said axle housing.

4. The portable jig of claim 1, wherein said bearing means includes at least one alignment sleeve of a predetermined size closely retained by said bearing means for supporting the replacement part.

5. The portable jig of claim 1, wherein said support means includes magnetic means for supporting the replacement part in proper alignment.

References Cited

UNITED STATES PATENTS

| | | |
|---|---|---|
| 2,680,287 | 6/1954 | Wilson. |
| 2,759,258 | 8/1956 | Carlson _____ 29—149.5 |
| 3,176,378 | 4/1965 | Janiszewski _____ 29—149.5 |

THOMAS H. EAGER, Primary Examiner

U.S. Cl. X.R.

29—401